(12) United States Patent
Suciu et al.

(10) Patent No.: US 9,038,398 B2
(45) Date of Patent: May 26, 2015

(54) GAS TURBINE ENGINE BUFFER COOLING SYSTEM

(75) Inventors: Gabriel L. Suciu, Glastonbury, CT (US); Ioannis Alvanos, West Springfield, MA (US)

(73) Assignee: United Technologies Corporation, Hartford, CT (US)

( * ) Notice: Subject to any disclaimer, the term of this patent is extended or adjusted under 35 U.S.C. 154(b) by 666 days.

(21) Appl. No.: 13/405,466

(22) Filed: Feb. 27, 2012

(65) Prior Publication Data

US 2013/0219917 A1     Aug. 29, 2013

(51) Int. Cl.
| | |
|---|---|
| *F02C 6/08* | (2006.01) |
| *F01D 5/08* | (2006.01) |
| *F02C 7/06* | (2006.01) |
| *F02C 7/18* | (2006.01) |

(52) U.S. Cl.
CPC . *F02C 6/08* (2013.01); *F01D 5/081* (2013.01); *F02C 7/06* (2013.01); *F02C 7/185* (2013.01)

(58) Field of Classification Search
CPC ............ F02C 7/18; F02C 7/185; F01D 25/18; F01D 25/183; F01D 25/20; F01D 25/22; Y02T 50/675
USPC ........ 60/785, 795, 806, 728, 39.08, 266, 267, 60/782
See application file for complete search history.

(56) References Cited

U.S. PATENT DOCUMENTS

| | | |
|---|---|---|
| 4,561,246 A | 12/1985 | Hovan |
| 4,574,584 A | 3/1986 | Hovan |
| 4,709,545 A * | 12/1987 | Stevens et al. ............... 60/39.08 |
| 5,392,614 A | 2/1995 | Coffinberry |
| 5,402,636 A | 4/1995 | Mize et al. |
| 5,611,197 A | 3/1997 | Bunker |
| 5,782,076 A | 7/1998 | Huber et al. |
| 5,918,458 A | 7/1999 | Coffinberry et al. |
| 6,098,395 A | 8/2000 | North |
| 6,124,646 A | 9/2000 | Artinian et al. |
| 6,183,193 B1 | 2/2001 | Glasspoole et al. |
| 6,250,061 B1 | 6/2001 | Orlando |
| 6,468,032 B2 | 10/2002 | Patel |

(Continued)

FOREIGN PATENT DOCUMENTS

| | | |
|---|---|---|
| EP | 0570217 B1 | 10/1997 |
| EP | 0608142 B1 | 10/1999 |

(Continued)

OTHER PUBLICATIONS

International Preliminary Report on Patentability for International application No. PCT/US2013/026766 dated Sep. 12, 2014.

(Continued)

*Primary Examiner* — Craig Kim
(74) *Attorney, Agent, or Firm* — Carlson, Gaskey & Olds

(57) ABSTRACT

A gas turbine engine includes a heat exchanger, a bearing compartment, and a nozzle assembly in fluid communication with the bearing compartment. The heat exchanger exchanges heat with a bleed airflow to provide a conditioned airflow. The bearing compartment is in fluid communication with the heat exchanger. A first passageway communicates the conditioned airflow from the heat exchanger to the bearing compartment. A second passageway communicates the conditioned airflow from the bearing compartment to the nozzle assembly.

7 Claims, 4 Drawing Sheets

(56) References Cited

U.S. PATENT DOCUMENTS

| | | |
|---|---|---|
| 7,000,404 B2 | 2/2006 | Palmisano et al. |
| 7,114,339 B2 | 10/2006 | Alvanos et al. |
| 7,562,519 B1 | 7/2009 | Harris et al. |
| 7,823,389 B2 | 11/2010 | Seitzer et al. |
| 8,056,345 B2 | 11/2011 | Norris et al. |
| 8,061,969 B2 | 11/2011 | Durocher et al. |
| 8,683,811 B2 | 4/2014 | Clemen et al. |
| 2002/0076318 A1 | 6/2002 | Patel |
| 2002/0148213 A1 | 10/2002 | Yu |
| 2005/0111964 A1* | 5/2005 | Krammer et al. ............. 415/115 |
| 2008/0112798 A1 | 5/2008 | Seitzer et al. |
| 2008/0310955 A1 | 12/2008 | Norris et al. |
| 2009/0010751 A1 | 1/2009 | McCaffrey et al. |
| 2009/0019858 A1 | 1/2009 | Roberge |
| 2009/0044543 A1 | 2/2009 | Clemen et al. |
| 2010/0132370 A1 | 6/2010 | Durocher et al. |
| 2010/0275612 A1 | 11/2010 | Smoke et al. |
| 2011/0030386 A1 | 2/2011 | Kumar et al. |
| 2011/0079019 A1 | 4/2011 | Durocher et al. |
| 2011/0088405 A1 | 4/2011 | Turco |
| 2011/0126543 A1 | 6/2011 | Kirsopp et al. |
| 2011/0271689 A1 | 11/2011 | Lacy et al. |

FOREIGN PATENT DOCUMENTS

| | | |
|---|---|---|
| EP | 1890005 A2 | 2/2008 |
| EP | 1923539 A2 | 5/2008 |
| EP | 2374995 A2 | 10/2011 |

OTHER PUBLICATIONS

International Preliminary Report on Patentability for International application No. PCT/US2013/025507 dated Sep. 12, 2014.

International Preliminary Report on Patentability for International application No. PCT/US2013/025506 dated Sep. 12, 2014.

International Preliminary Report on Patentability for International application No. PCT/US2013/026767 dated Sep. 12, 2014.

International Search Report and Written Opinion of the International Search Authority for International application No. PCT/US2013/025507 dated Jun. 2, 2013.

International Search Report and Written Opinion of the International Search Authority for International application No. PCT/US2013/025506 dated May 24, 2013.

International Search Report and Written Opinion of the International Search Authority for International application No. PCT/US2013/026766 dated May 29, 2013.

International Search Report and Written Opinion of the International Search Authority for International application No. PCT/US2013/026767 dated Jun. 4, 2013.

Written Opinion for Singapore Application No. 11201404760Y dated Jan. 14, 2015.

* cited by examiner

GAS TURBINE ENGINE BUFFER COOLING SYSTEM

BACKGROUND

This disclosure relates to a gas turbine engine, and more particularly to a buffer cooling system that establishes a buffer cooled cooling air path for conditioning portions of the gas turbine engine.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine loads.

Gas turbine engines typically channel airflow through the core engine components along a primary gas path. Portions of the gas turbine engine can be conditioned (i.e. heated or cooled) to ensure reliable performance and durability. For example, some parts of the compressor section and the turbine section, such as rotor assemblies that carry rotating blades, may require conditioning during engine operation to cool such components.

SUMMARY

A gas turbine engine includes a heat exchanger, a bearing compartment, and a nozzle assembly. The heat exchanger exchanges heat with a bleed airflow to provide a conditioned airflow. The bearing compartment is in fluid communication with the heat exchanger. A first passageway communicates the conditioned airflow from the heat exchanger to the bearing compartment. A nozzle assembly is in fluid communication with the bearing compartment. A second passageway communicates the conditioned airflow from the bearing compartment to the nozzle assembly.

In a further embodiment of the foregoing gas turbine engine embodiment, the nozzle assembly can include a tangential onboard injection (TOBI) nozzle.

In a further embodiment of either of the foregoing gas turbine engine embodiments, a rotor assembly can be positioned downstream from the nozzle assembly and can be conditioned by the conditioned airflow from the nozzle assembly.

In a further embodiment of any of the foregoing gas turbine engine embodiments, the first passageway and the second passageway can include tubing.

In a further embodiment of any of the foregoing gas turbine engine embodiments, a support that is associated with the bearing compartment can include at least one opening for communicating the conditioned airflow from the bearing compartment into the second passageway.

In a further embodiment of any of the foregoing gas turbine engine embodiments, the bleed airflow is communicated from a compressor section of the gas turbine engine.

In a further embodiment of any of the foregoing gas turbine engine embodiments, the heat exchanger exchanges heat between the bleed airflow and a fan airflow to render the conditioned airflow.

In a further embodiment of any of the foregoing gas turbine engine embodiments, the conditioned airflow is communicated radially outwardly from a bearing housing of the bearing compartment.

In another exemplary embodiment, a gas turbine engine includes a compressor section, a combustor section and a turbine section circumferentially disposed about an engine centerline axis. A buffer cooling system establishes a buffer cooled cooling air path that conditions portions of at least one of the compressor section and the turbine section. The buffer cooling system includes a heat exchanger, a passageway and a nozzle assembly. The buffer cooled cooling air path extends from the heat exchanger, through the passageway, and then through the nozzle assembly to cool hardware associated with at least one of the compressor section and the turbine section.

In a further embodiment of the foregoing gas turbine engine embodiment, the hardware can include a rotor assembly.

In a further embodiment of either of the foregoing gas turbine engine embodiments, the nozzle assembly can include a tangential onboard injection (TOBI) nozzle.

In a further embodiment of any of the foregoing gas turbine engine embodiments, the buffer cooled cooling air path extends through a portion of a bearing compartment between the passageway and the nozzle assembly.

In a further embodiment of any of the foregoing gas turbine engine embodiments, the buffer cooled cooling air path communicates a conditioned airflow radially outwardly from a bearing housing of the bearing compartment.

In a further embodiment of any of the foregoing gas turbine engine embodiments, the heat exchanger exchanges heat between a bleed airflow and a fan airflow to render a conditioned airflow that is communicated along the buffer cooled cooling air path.

In a further embodiment of any of the foregoing gas turbine engine embodiments, a first portion of a conditioned airflow of the buffer cooled cooling air path is communicated through the nozzle assembly to condition the turbine section and a second portion of the conditioned airflow can be communicated through a second nozzle assembly to condition the compressor section.

In a further embodiment of any of the foregoing gas turbine engine embodiments, a first portion of the conditioned airflow is communicated downstream through the passageway and the second portion is communicated upstream through a second, different passageway.

In yet another exemplary embodiment, a method of cooling a portion of a gas turbine engine includes removing heat from a bleed airflow to render a conditioned airflow, communicating the conditioned airflow through a bearing compartment of a gas turbine engine, and feeding the conditioned airflow from the bearing compartment through a nozzle assembly to a location of the gas turbine engine that requires cooling.

In a further embodiment of the foregoing method, the method can include cooling a rotor assembly of the gas turbine engine with the conditioned airflow.

In a further embodiment of either of the foregoing methods, the step of communicating the conditioned airflow includes communicating the conditioned airflow from a heat exchanger, through a passageway, then through the bearing compartment, and then through the nozzle assembly.

The various features and advantages of this disclosure will become apparent to those skilled in the art from the following detailed description. The drawings that accompany the detailed description can be briefly described as follows.

DETAILED DESCRIPTION

Figure 1:
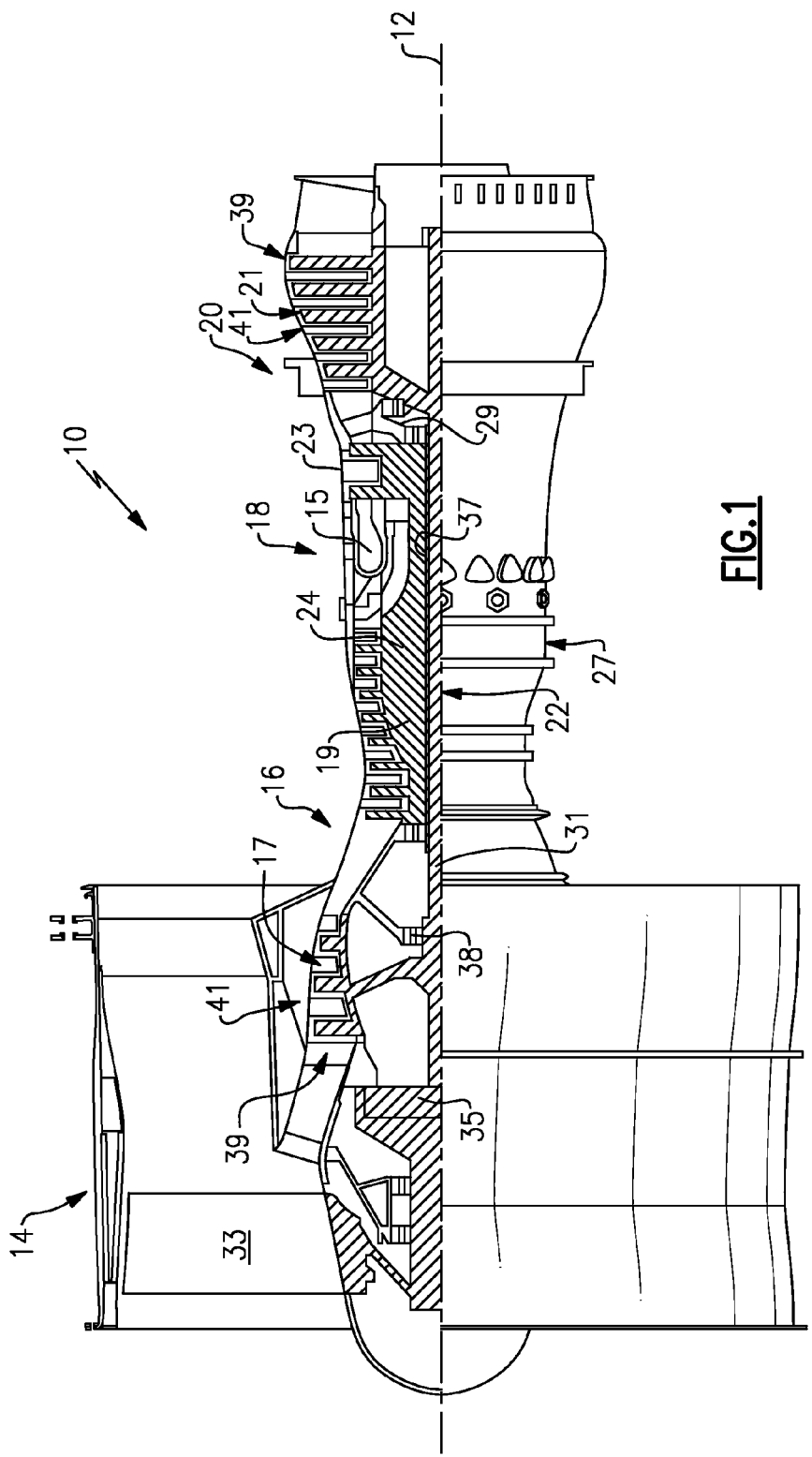
FIG. 1 schematically illustrates a cross-sectional view of a gas turbine engine.

FIG. 1 schematically illustrates a gas turbine engine 10. The example gas turbine engine 10 is a two spool turbofan engine that generally incorporates a fan section 14, a compressor section 16, a combustor section 18 and a turbine section 20. Alternative engines might include fewer or additional sections such as an augmenter section (not shown), among other systems or features. Generally, the fan section 14 drives air along a bypass flow path, while the compressor section 16 drives air along a core flow path for compression and communication into the combustor section 18. The hot combustion gases generated in the combustor section 18 are expanded through the turbine section 20. This view is highly schematic and is included to provide a basic understanding of the gas turbine engine 10 and not to limit the disclosure. This disclosure extends to all types of gas turbine engines and to all types of applications, including but not limited to, three spool turbofan configurations.

The exemplary gas turbine engine 10 of FIG. 1 generally includes at least a low speed spool 22 and a high speed spool 24 mounted for rotation about an engine centerline axis 12 relative to an engine static structure 27 via several bearing systems 38. The low speed spool 22 generally includes an inner shaft 31 that interconnects a fan 33, a low pressure compressor 17, and a low pressure turbine 21. The inner shaft 31 can connect to the fan 33 through a geared architecture 35 to drive the fan 33 at a lower speed than the low speed spool 22. Although the geared architecture 35 is schematically depicted between the fan 33 and the low pressure compressor 17, it should be understood that the geared architecture 35 could be disposed at other locations of the gas turbine engine. The high speed spool 24 includes an outer shaft 37 that interconnects a high pressure compressor 19 and a high pressure turbine 23.

A combustor 15 is arranged between the high pressure compressor 19 and the high pressure turbine 23. The inner shaft 31 and the outer shaft 37 are concentric and rotate about the engine centerline axis 12. A core airflow is compressed by the low pressure compressor 17 and the high pressure compressor 19, is mixed with fuel and burned within the combustor 15, and is then expanded over the high pressure turbine 23 and the low pressure turbine 21. The turbines 21, 23 rotationally drive the low speed spool 22 and the high speed spool 24 in response to the expansion.

The compressor section 16 and the turbine section 20 can each include alternating rows of rotor assemblies 39 and vane assemblies 41. The rotor assemblies 39 carry a plurality of rotating blades, while each vane assembly 41 includes a plurality of stator vanes. The blades of the rotor assemblies 39 create or extract energy (in the form of pressure) from the airflow that is communicated through the gas turbine engine 10. The vanes of the vane assemblies 41 direct airflow to the blades of the rotor assemblies 39 to either add or extract energy. Each vane of the vane assemblies 41 is circumferentially retained to the gas turbine engine 10, as is further discussed below.

It should be understood that various bearing systems 38 could be positioned at alternative or additional locations of the gas turbine engine 10. The bearing systems 38, along with other gas turbine engine structures and systems, define internal compartments that are sometimes pressurized. As discussed in greater detail below, the bearing systems 38 can be used to communicate a conditioned airflow to parts of the gas turbine engine 10 that require conditioning.

Figure 2:
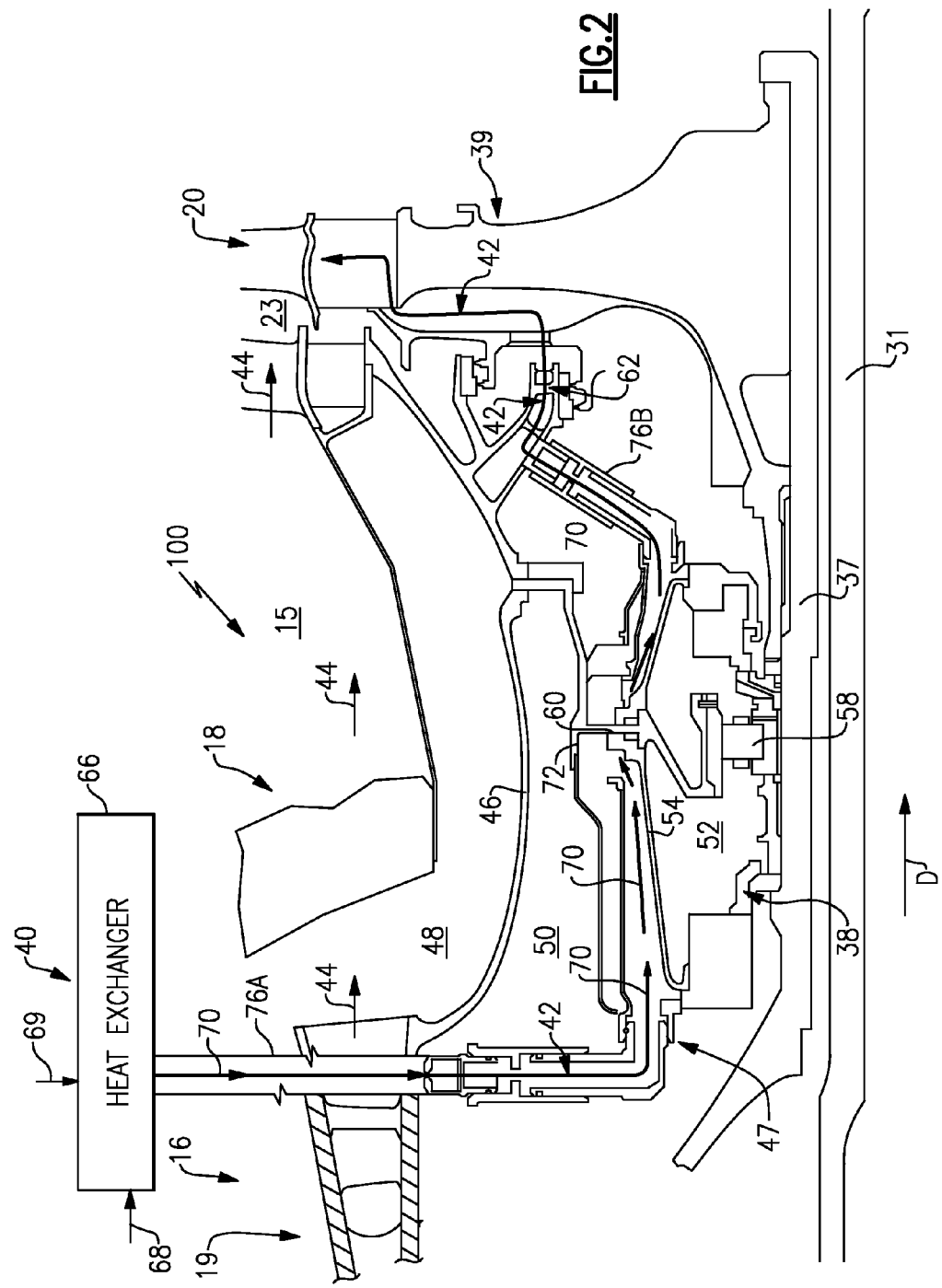
FIG. 2 illustrates a buffer cooling system that can be incorporated into a gas turbine engine.

FIG. 2 illustrates a portion 100 of the gas turbine engine 10. In this example, the portion 100 encompasses parts of the compressor section 16, the combustor section 18 and the turbine section 20 of a gas turbine engine. However, it should be understand that this disclosure could extend to other parts of these sections beyond what is shown by FIG. 2.

In the illustrated example, a diffuser case 46 extends radially inwardly from the combustor 15 and divides an interior 47 of the portion 100 into an outer cavity 48 and an inner cavity 50. A primary gas path 44 (for the communication of core airflow) can be communicated through the outer cavity 48, while a buffer cooled cooling air path 42 extends through the inner cavity 50.

A bearing compartment 52 associated with a bearing system 38 is positioned radially inward from the diffuser case 46 within the inner cavity 50. A bearing housing 54 extends circumferentially about the outer shaft 37 to house a bearing 58 within the bearing compartment 52. A strut 60 extends between the diffuser case 46 and the bearing compartment 52. The strut 60 extends radially inwardly from the diffuser case 46 across a portion of the inner cavity 50. The bearing housing 54 circumferentially surrounds the bearing 58 to protect the bearing 58 and to confine any lubricant inside of the bearing compartment 52.

A buffer cooling system 40 establishes a buffer cooled cooling air path 42 for the communication of a conditioned airflow 70 through the portion 100. In this disclosure, the term "conditioned airflow" includes both cooled and heated airflows. The buffer cooling system 40 includes a heat exchanger 66, the bearing compartment 52, and a nozzle assembly 62 that is fed with a conditioned airflow 70 received from the bearing compartment 52, as discussed in greater detail below.

The buffer cooled cooling air path 42 is separate from the primary gas path 44 that communicates the core gases axially through the compressor section 16, the combustor section 18 and the turbine section 20. In this example, the primary gas path 44 is communicated from the high pressure compressor 19, through the combustor 15, and axially through the high pressure turbine 23.

Figure 3:
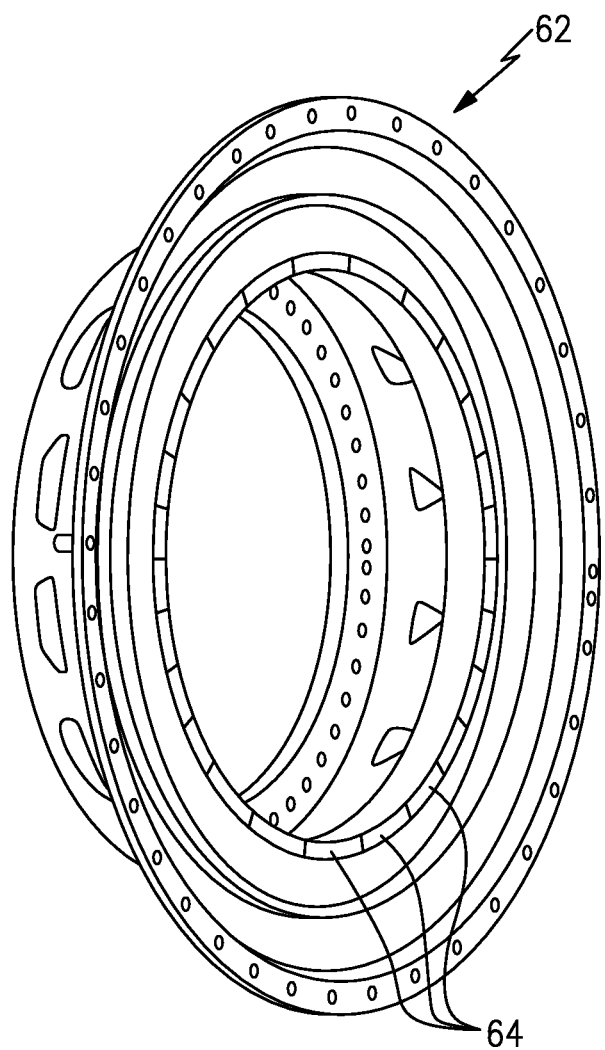
FIG. 3 illustrates an example nozzle assembly of the buffer cooling system of FIG. 2.

The nozzle assembly 62 communicates a conditioned airflow 70 of the buffer cooled cooling air path 42 in a downstream direction D toward the high pressure turbine 23 and its associated hardware. The nozzle assembly 62 can include a tangential onboard injection (TOBI) nozzle or other suitable nozzle that is capable of communicating a conditioned airflow. An example nozzle assembly 62 is illustrated in FIG. 3. The TOBI nozzle imparts a swirling movement and directs the airflow tangentially to downstream hardware, such as to the rotor assembly 39. The nozzle assembly 62 can include a plurality of openings 64 (seen in FIG. 3) for communicating the conditioned airflow of the buffer cooled cooling air path 42.

The heat exchanger 66 of the buffer cooling system 40 can be mounted at any location of the gas turbine engine 10. One example non-limiting mounting location is at the outer engine casing. The heat exchanger receives a bleed airflow 68, such as from the compressor section 16 or some other upstream location of the gas turbine engine 10, and exchanges heat between the bleed airflow 68 and another fluid medium 69 to render a conditioned airflow 70. One example fluid medium 69 is airflow from the fan section 14. However, the heat exchanger 66 can include any type of heat exchanger including an air/air heat exchanger, a fuel/air heat exchanger or any other type of heat exchanger.

The conditioned airflow 70 is communicated along the buffer cooled cooling air path 42. The buffer cooled cooling path 42 extends from the heat exchanger 66 into the inner cavity 50 and then into the bearing compartment 52. The buffer cooled cooling air path 42 extends through an opening 72 (or alternatively a series of openings) in the support 60 of the bearing compartment 52 at a location that is radially outward from the bearing housing 54 and is then communicated through the nozzle assembly 62 onboard of hardware, such as the rotor assembly 39, of the high pressure turbine 23. Other hardware of the gas turbine engine 10 can additionally or alternatively be conditioned by the buffer cooled cooling air path 42. The conditioned airflow 70 of the buffer cooled cooling air path 42 can be used to condition the disk, rim, web and blade of the rotor assembly 39, as well as other downstream stages, parts and components. Providing the example buffer cooled cooling air path minimizes the relatively high temperature impact on the hardware of the gas turbine engine 10 during operation.

A first passageway 76A extends between the heat exchanger 66 and the bearing compartment 52 for communicating the conditioned airflow 70 of the buffer cooled cooling air path 42. A second passageway 76B extends between the bearing compartment 52 and the nozzle assembly 62 for communicating the conditioned airflow 70 further downstream in a direction toward the high pressure turbine 23. The passageways 76A, 76B can include tubing, ducting or other conduits that are capable of communicating a conditioned airflow through the gas turbine engine 10. It should be understood that the passageways 76A, 76B are not necessarily shown to the scale they would be in practice. Rather, in the illustrated embodiment, the passageways 76A, 76B are shown enlarged to better illustrate their features. The passageways 76A, 76B could also be positioned at other locales of the portion 100 besides those depicted in FIG. 2.

Figure 4:
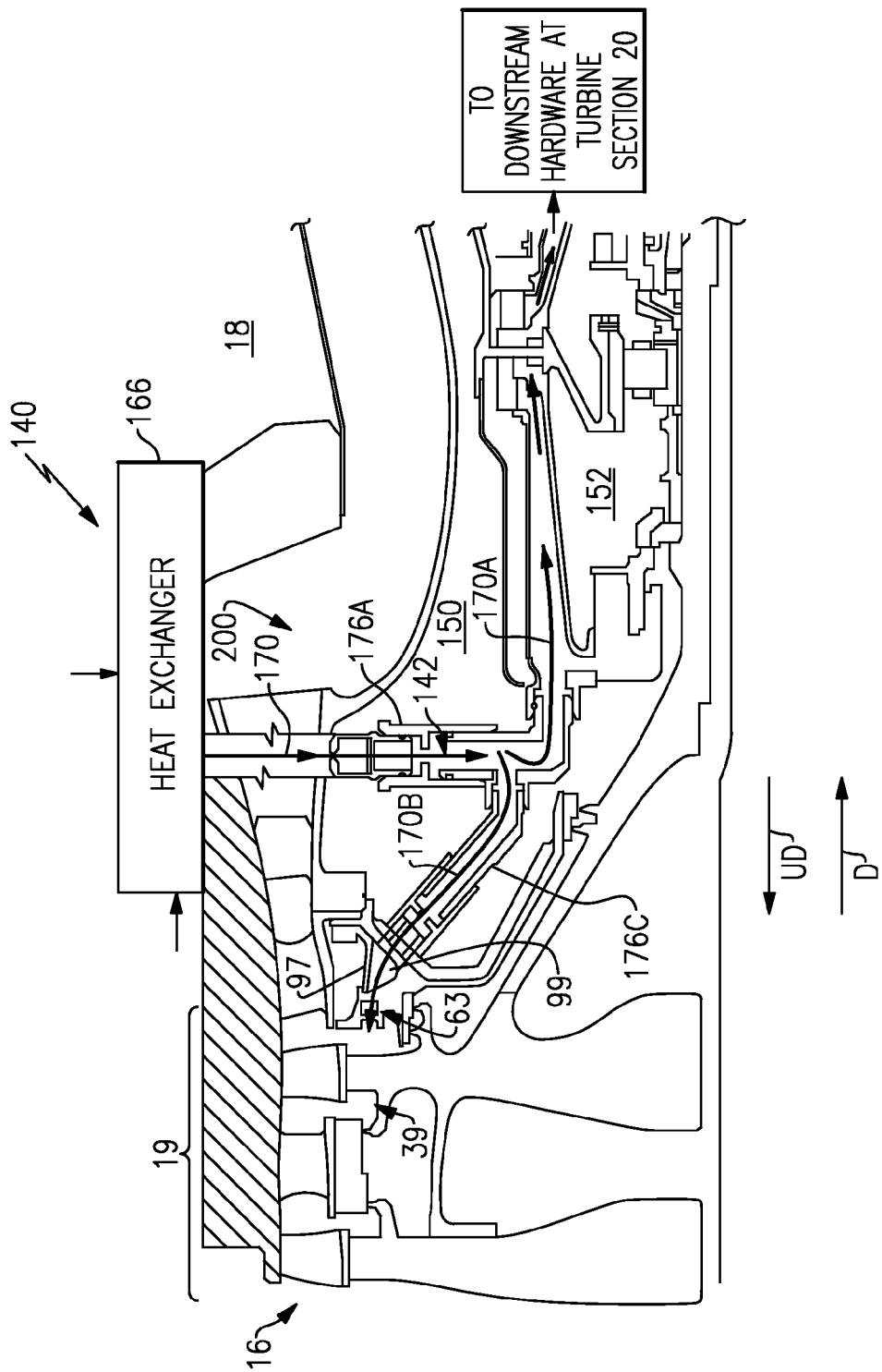
FIG. 4 illustrates another example buffer cooling system that can be incorporated into a gas turbine engine.

FIG. 4 illustrates another example buffer cooling system 140 that can be incorporated into a portion 200 of the gas turbine engine 10. In this example, the portion 200 encompasses parts of the compressor section 16, the combustor section 18 and the turbine section 20 of a gas turbine engine. However, it should be understand that this disclosure could extend to other parts of these sections beyond what is shown by FIG. 2.

The buffer cooling system 140 establishes a buffer cooled cooling air path 142 for the communication of a conditioned airflow 170 to one or more locales of the portion 200. The buffer cooling system 140 may include a second nozzle assembly 63 (that is separate from the nozzle assembly 62 of FIG. 2) that is fed with at least a portion 170B of the conditioned airflow 170 received from a heat exchanger 166. The buffer cooling system 140 could be used alone to condition portions of the compressor section 16 and a bearing compartment 152 or in combination with the hardware of the buffer cooling system 40 (see FIG. 2) that can communicate a portion 170A of the conditioned airflow 170 through the bearing compartment 152 and then downstream to the hardware of the turbine section 20. The buffer cooled cooling air path 142 is separate from the primary gas path 44.

The nozzle assembly 63 and a ring structure 97 establish a compartment 99 just aft of the compressor section 16. The compartment 99 acts as a plenum for feeding the portion 170B of the conditioned airflow 170 to the nozzle assembly 63. The nozzle assembly 63 can include a "mini" tangential onboard injection (TOBI) nozzle or other suitable nozzle that is capable of communicating a conditioned airflow.

In this example, the nozzle assembly 63 communicates the conditioned airflow 170B of the buffer cooled cooling air path 142 in an upstream direction UD toward the high pressure compressor 19 and its associated hardware. The buffer cooling path 142 could also extend in a downstream direction D toward the turbine section 20 and its associated hardware. It should be understood that the buffer cooling system 140 could communicate only the portion 170B of the conditioned airflow 170, to only the portion 170A of the conditioned airflow 170 or both the portions 170A and 170B.

The portion 170B of the conditioned airflow 170 is communicated along the buffer cooled cooling air path 142. In this example, the buffer cooled cooling air path 142 extends from the heat exchanger 166 into an inner cavity 150 and then upstream toward the nozzle assembly 63. The portion 170B of the conditioned airflow 170 is communicated into the compartment 99 and then communicated through the nozzle assembly 63 onboard of hardware, such as a rotor assembly 39 of the high pressure compressor 19. Other hardware of the gas turbine engine 10 can additionally or alternatively be conditioned by the buffer cooled cooling air path 142. The portion 170B of the conditioned airflow of the buffer cooled cooling air path 142 can be used to condition the disk, rim, web and blade of the rotor assembly 39, as well as other upstream stages, parts and components. Providing the example buffer cooled cooling air path minimizes the relatively high temperature impact on the hardware of the gas turbine engine 10 during operation.

A first passageway 176A extends between the heat exchanger 166 and the bearing compartment 152 for communicating the conditioned airflow 170 of the buffer cooled cooling air path 142. A second passageway 76B extends between the bearing compartment 152 and the nozzle assembly 62 for communicating the portion 170A of the conditioned airflow 170 further downstream in a direction toward the turbine section 20 (See FIG. 2). A third passageway 176C extends between the first passageway 176A and the second nozzle assembly 63 for communicating the portion 170B of the conditioned airflow 170 upstream in a direction toward the compressor section 16.

The passageways 176A, 76B and 176C can include tubing, ducting or other conduits that are capable of communicating a conditioned airflow through the gas turbine engine 10. It should be understood that the passageways 176A, 76B and 176C are not necessarily shown to the scale they would be in practice. Rather, in the illustrated embodiments, the passageways 176A, 76B and 176C are shown enlarged to better illustrate their features. The passageways 176A, 76B and 176C could also be positioned at other locales of the portion 200 besides those depicted in FIGS. 2 and 4.

Although the different examples have a specific component shown in the illustrations, embodiments of this disclosure are not limited to those particular combinations. It is possible to use some of the components or features from one of the examples in combination with features or components from another one of the examples.

Furthermore, the foregoing description shall be interpreted as illustrative and not in any limiting sense. A worker of ordinary skill in the art would understand that certain modification could come within the scope of this disclosure. For these reasons, the following claims should be studied to determine the true scope and content of this disclosure.

What is claimed is:

1. A gas turbine engine, comprising:
   a compressor section, a combustor section and a turbine section circumferentially disposed about an engine centerline axis;
   a buffer cooling system that establishes a buffer cooled cooling air path that conditions a part of at least one of said compressor section and said turbine section, wherein said buffer cooling system includes a heat exchanger, a passageway and a nozzle assembly, and said buffer cooled cooling air path extends from said heat exchanger, through said passageway, and then through said nozzle assembly to condition hardware of at least one of said compressor section and said turbine section; and a second nozzle assembly, wherein a first portion of a conditioned airflow of said buffer cooled cooling air path is communicated through said nozzle assembly to condition said turbine section and a second portion of said conditioned airflow is communicated through said second nozzle assembly to condition said compressor section.

2. The gas turbine engine as recited in claim 1, wherein said hardware includes a rotor assembly.

3. The gas turbine engine as recited in claim 1, wherein said nozzle assembly is a tangential onboard injection (TOBI) nozzle.

4. The gas turbine engine as recited in claim 1, comprising a bearing compartment, wherein said buffer cooled cooling air path extends through a portion of said bearing compartment between said passageway and said nozzle assembly.

5. The gas turbine engine as recited in claim 4, wherein said buffer cooled cooling air path communicates a conditioned airflow radially outwardly from a bearing housing of said bearing compartment.

6. The gas turbine engine as recited in claim 1, wherein said heat exchanger exchanges heat between a bleed airflow and a fan airflow to render a conditioned airflow that is communicated along said buffer cooled cooling air path.

7. The gas turbine engine as recited in claim 1, wherein said first portion of said conditioned airflow is communicated downstream through said passageway and said second portion is communicated upstream through a second, different passageway.

* * * * *